(No Model.)
F. C. C. KAHLER.
NECKTIE FASTENER.
No. 287,442.                     Patented Oct. 30, 1883.
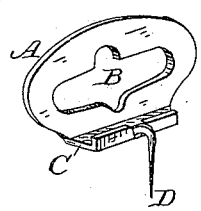
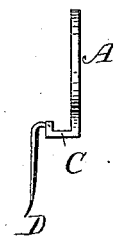
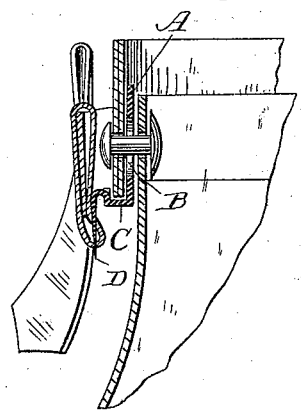
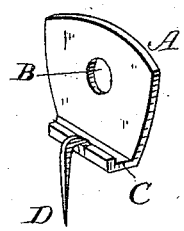
Witnesses:
Inventor:
F. C. C. Kahler,
by Henry Calver
Atty.

UNITED STATES PATENT OFFICE.

FRANK C. C. KAHLER, OF CHICAGO, ILLINOIS.

NECKTIE-FASTENER.

SPECIFICATION forming part of Letters Patent No. 287,442, dated October 30, 1883.

Application filed September 12, 1883. (No model.)

*To all whom it may concern:*

Be it known that I, FRANK C. C. KAHLER, a citizen of the United States, residing at Chicago, in the county of Cook and State of Illinois, have invented certain new and useful Improvements in Necktie-Fasteners, of which the following is a specification, reference being had therein to the accompanying drawings.

The object of my invention is to provide a simple and effective device for retaining gentlemen's neckties in proper position, thus preventing the annoyance incidental to the displacement of these articles of apparel. I accomplish this object by means of a small plate provided with an aperture, which permits it to be placed on the collar-button between the collar-band and the collar, said plate being provided with a horizontal ledge adapted to receive the ends of the buttoned collar, and said ledge having a depending pin for engaging the necktie. The ends of the collar, bearing on the horizontal ledge, will prevent the plate from rocking on the shank of the collar-button, thus avoiding any lateral displacement of the fastener, while the depending pin, entering the necktie, will prevent the tie from working upward.

In the drawings, Figure 1 is a perspective view of one form of my invention. Fig. 2 is a side view of the same. Fig. 3 is a sectional view, showing my fastener in operative relation to a shirt-band, collar-button, collar, and necktie. Fig. 4 is a perspective view of a modified form of my invention specially adapted to collar-buttons having detachable heads.

A is the back plate of my device, said plate being provided with an aperture or opening, B, of proper form to permit the same to be placed on the shank of a collar-button by passing said plate over the head of said button. The plate A has a forwardly-projecting horizontal ledge, C, the front of which is preferably turned upward a little, so as to form a slight groove, and the ledge is provided in its front side with a depending or downwardly-projecting pin, D. The entire device, including the pin, is preferably formed of a single piece of metal, and the blank of which it is made may be stamped from sheet metal, and the fastener then bent into proper shape and the pin sharpened; or, if desired, the fastener might be formed of cast metal.

In using my fastener it will be placed over the collar-button before the collar is buttoned, so that the ends of the latter, resting on the horizontal ledge C, will prevent the fastener from rocking on the shank of the collar-button. The necktie or scarf will then be adjusted into position, and by a slight upward push of the tie or scarf against the pin the tie or scarf will become impaled on the latter, which thus securely holds the former in position. In using the form of my invention shown in Fig. 4 the removable or detachable head of the collar-button will be taken off before the fastener is placed in position on the shank of the collar-button, and after the collar has been buttoned the detachable head will be replaced in the usual manner and the necktie or scarf adjusted as above indicated.

Having thus described my invention, I claim as new and desire to secure by Letters Patent—

A necktie-fastener consisting of the back plate, A, having an aperture, B, a forwardly-projecting ledge, C, on the lower side of said plate, and a pin, D, on said ledge, substantially as described.

In testimony whereof I affix my signature in presence of two witnesses.

FRANK C. C. KAHLER.

Witnesses:
JOHN F. BIGELOW,
CHR. PFEIFFER.